United States Patent Office 2,987,808
Patented June 13, 1961

2,987,808
METHOD OF WELDING AND FLUX THEREFOR
Harold L. Benham, Bedford, Ind., assignor to General Motors Corporation, Detroit, Mich., a corporation of Delaware
No Drawing. Filed Mar. 24, 1960, Ser. No. 17,257
4 Claims. (Cl. 29—401)

This invention relates to the art of welding cast iron and more particularly to a method of welding cast iron articles such as dies and permanent molds used for casting aluminum.

In the normal operation of a foundry using cast iron permanent molds, die casting dies and the like for making aluminum castings, it is frequently necessary to repair the molding faces of the permanent molds since these become impaired by aluminum corrosion and other causes. As a practical matter, such repairs may be only done by a welding operation. A serious shortcoming in the use of conventional welding techniques to repair the mold faces is that blow holes tend to form in the weld metal. These must be ground out and rewelded. The formation of the blow holes in the weld metal is believed to be caused by the evolution of hydrogen gas from the cast iron during the welding process. The hydrogen in turn is believed to be absorbed by the cast iron from the aluminum castings formed adjacent the mold faces during the casting operation.

It is an object of this invention to provide a flux for use in welding cast iron which is effective in eliminating or substantially reducing the formation of blow holes in the weld metal. It is a further object of this invention to provide a welding method for repairing cast iron permanent molds which have been used in the manufacture of aluminum castings.

These and other objects of the invention are accomplished by providing a flux consisting essentially of potassium chlorate, potassium permanganate and cryolite. A preferred flux composition consists of 100 parts by weight of potassium chlorate, 1 part by weight of potassium permanganate and 2 parts by weight of cryolite. The repair of a cast iron mold or die is accomplished by first grinding the surfaces to be welded. The ground surfaces are then heated to a temperature of about 500° F. to 600° F. Next, the aforementioned flux is applied. Finally the flux is removed and the repair is accomplished by acetylene welding with a nickel welding rod.

Other objects and advantages of the present invention will appear from the following detailed description of the invention.

In modern foundry practice, a wide variety of aluminum articles may be satisfactorily cast in permanent molds made essentially of cast iron. In foundary operations involving large production volume, aluminum articles may be economically and efficiently cast in permanent molds in spite of the fact that permanent molds are expensive to make, particularly where the article to be cast is relatively complex such as, for instance, a finned aluminum cylinder block. Since in the normal use of the permanent molds, portions of the molding face tend to corrode, burn out or otherwise become damaged and produce faulty castings, it is necessary to repair the molding faces from time to time if such a casting process is to be performed on an economical basis.

The repair of cast iron permanent mold surfaces in accordance with the present invention is performed in the following steps. First, the mold surface to be repaired is cleaned by any suitable means, preferably by grinding away the burned or otherwise damaged surfaces. Next, the mold surface is heated with an oxy-acetylene-type torch to a temperature ranging from about 500° F. to 600° F. and preferably about 550° F. After the mold surface has been heated to this temperature, the flux of the present invention preferably consisting of 100 parts by weight of potassium chlorate, 1 part by weight of potassium permanganate and 2 parts by weight of cryolite is applied to the heated surface to be repaired. The flux melts and bubbles on contact with the heated metal surface. It is believed that in this bubbling process, oxygen released from the flux unites with the hydrogen at the surface of the cast iron mold surface to thereby remove the hydrogen therefrom. After the bubbling action has ceased, the flux is removed, preferably by means of a wire brush or the like. The portion of the mold surface to be repaired is then filled or built up by a welding procedure utilizing a nickel welding rod and a conventional oxy-acetylene torch, taking care to provide a slight excess of metal. The weld is finally ground and polished down to the mold cavity dimension.

The flux of the present invention may be varied with satisfactory results so that 0.5 to 10 parts by weight of potassium permanganate and 0.5 to 5 parts by weight of cryolite may be present per 100 parts by weight of potassium chlorate. If desired, manganese dioxide may be used in place of the potassium permanganate. The flux may be readily and simply prepared by merely providing each ingredient in finely divided form and mixing the powders thoroughly.

While the present invention has been described by means of specific examples, it will be understood that the scope of the invention is not to be limited thereby except as defined by the following claims.

I claim:
1. A welding flux useful for welding ferrous metals rich in hydrogen consisting substantially of 100 parts by weight of potassium chlorate, 0.5 to 10 parts by weight of a compound taken from the class consisting of potassium permanganate and manganese dioxide, and 0.5 to 5 parts by weight of cryolite.
2. A welding flux useful for welding ferrous metals rich in hydrogen consisting of 100 parts by weight of potassium chlorate, 1 part by weight of a compound taken from the class consisting of potassium permanganate and manganese dioxide and 2 parts by weight of cryolite.
3. A method of welding ferrous metals rich in surface hydrogen comprising the steps of cleaning the surface to be welded, preheating the surface to be welded to a temperature of about 500° F. to 600° F., applying a flux consisting essentially of 100 parts by weight of potassium chlorate, 0.5 to 10 parts by weight of a compound taken from the class consisting of potassium permanganate and manganese dioxide and 0.5 to 5 parts by weight of cryolite while said surface to be welded is at said temperature, permitting said flux to remain on said surfacee until bubbling has ceased, removing the flux and finally applying a weld metal to said surface.
4. A method of repairing a cast iron mold or die having mold cavity surfaces rich in hydrogen comprising the steps of cleaning the surface to be welded, preheating said surface to a temperature of about 500° F. to 600° F., applying a flux to said surface consisting essentially of about 100 parts by weight of potassium chlorate, about 1 part by weight of a compound selected from the class consisting of potassium permanganate and manganese dioxide and about 2 parts by weight of cryolite while said surface is at said temperature, permitting said flux to remain on said surface until bubbling has ceased, removing the flux and finally applying a weld metal to said surface from a nickel welding rod.

No references cited.